[11] 3,610,970

[72] Inventor Selby M. Skinner
   Baltimore, Md.
[21] Appl. No. 654,243
[22] Filed July 18, 1967
[45] Patented Oct. 5, 1971
[73] Assignee Westinghouse Electric Corporation
   Pittsburgh, Pa.

[54] ENERGY CONVERTER
   3 Claims, 14 Drawing Figs.
[52] U.S. Cl. ........................................ 310/10,
   310/5
[51] Int. Cl. ........................................ H02k
[50] Field of Search ........................... 310/2, 4, 5,
   10, 11; 320/1; 307/110, 108, 9; 73/516 LM, 516;
   322/2.1

[56] References Cited
   UNITED STATES PATENTS

| | | | |
|---|---|---|---|
| 2,413,391 | 12/1946 | Usselman | 307/108 X |
| 3,008,334 | 11/1961 | Lees | 73/503 |
| 3,154,699 | 10/1964 | Courtney-Pratt | 307/108 |
| 2,449,077 | 9/1948 | Lindenblad | 307/108 |
| 2,628,330 | 2/1953 | Williams | 315/200 |

*Primary Examiner*—David X. Sliney
*Attorneys*—F. H. Henson, C. F. Renz and R. L. Gable ABSTRACT: The invention relates to an energy converter in which electrical energy output is extracted from elements exhibiting a capacitance change in response to input energy. More particularly, the invention is directed to an energy converter in which the material between the capacitor electrodes is modified by physical movement of the material between the capacitor electrodes to modify the capacitance.

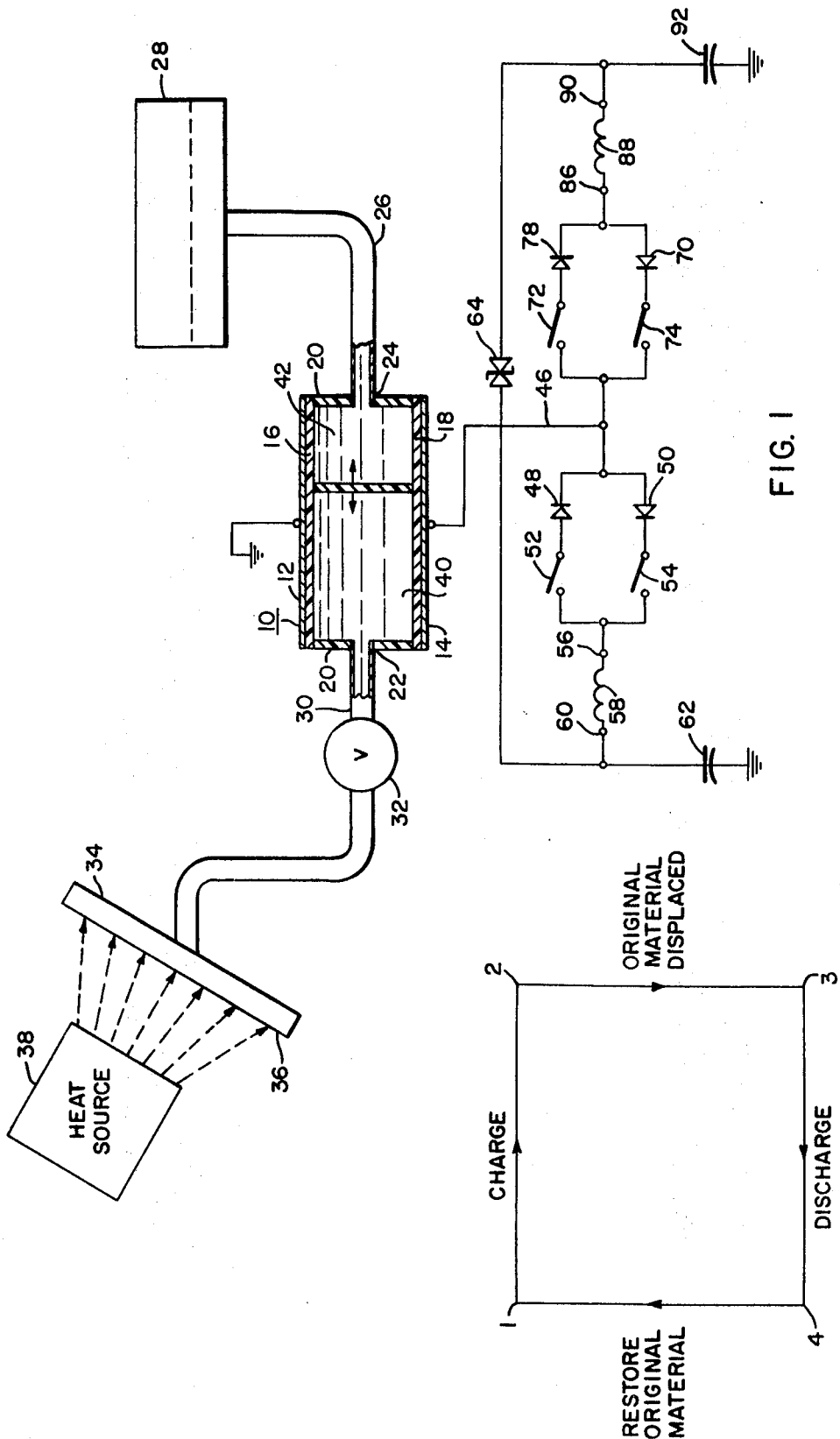

3,610,970

INVENTOR
Selby M. Skinner
BY Charles F. Renz
ATTORNEY

ENERGY CONVERTER

BACKGROUND OF THE INVENTION

This invention is related to energy conversion and more particularly to those devices in which an input energy in the form of thermal or other forms of energy are converted into an electrical energy output. One particular application of this invention is to provide an efficient lightweight electrical energy source particularly for space vehicles and their associated equipment.

Even in the best of solar cells, only a small fraction of the incident energy is converted into electricity. The remainder exists as heat energy and must be dissipated or converted by other means. Nuclear devices, engines, rocket exhausts, magnetohydrodynamic, thermionic and other means of energy conversion yield a sizable amount of unconverted thermal energy.

It is accordingly an object of this invention to provide means to change available energy to electrical energy.

It is still another object to provide from radiations normally available to space vehicles an efficient kind of lightweight device to provide electrical energy and particularly from the heat produced by the radiations.

One method of energy conversion which heretofore has been investigated only slightly for energy conversion utilizes the change of capacitance of an electrical capacitor. It is found that if a capacitor is charged and then its capacitance is changed, the difference in electrical energy content is:

$E=\frac{1}{2}Q^2(1/C_2 a 1/C_2)$ or
$E=\frac{1}{2}V^2(C_1-C_2)$ depending upon whether the change in capacitance is performed at constant charge or at a constant voltage. The electrical energy obtained by decreasing the capacitance of the charged capacitor must have originally been furnished by the phenomenon which causes the change in the capacitance.

One method of changing capacitance is modifying the dielectric constant of the material between the electrodes. One method previously studied is the thermodielectric cycle in which a temperature change in the dielectric results in a change in the dielectric constant. The results of the study of devices based on this thermodielectric cycle indicated that these devices would not be competitive with solar cells. Difficulty was found in finding materials which had sufficiently large values of change in dielectric with change in temperature over a sufficient temperature range. It was also difficult to obtain rapid enough heating and cooling of the thermodielectric materials to permit efficient cycling at rates of more than 1 hertz. The structure did have the advantage that heat which cannot be utilized by solar cells can be converted by the thermodielectric cycle.

SUMMARY OF THE INVENTION

This invention provides an energy conversion system in which a first material within the region between the electrodes of a condenser is replaced by a second material having a lower dielectric constant than the first material after the capacitor has been charged. The cycle consists of charging the capacitor, replacing the first material by a second material of lower permittivity than the first material, discharging the capacitor and restoring the first material. If a condenser is charged and then the material replaced by one of lower dielectric constant, the capacitance of the condenser is decreased and its electrical energy increases. The electrical energy output of the condenser results from the input energy to replace the material between the electrodes. The necessary mechanical force for moving the dielectric can arise from a thermal input, mechanical input, electrical input or magnetic input. The necessary requirement is that the input energy exerts the necessary force to move the materials.

BRIEF DESCRIPTION OF THE DRAWINGS

FIG. 1 is a schematic showing of an energy conversion system for converting thermal energy to electrical energy and embodying the teaching of this invention;

FIG. 2 is a cycle diagram illustrating the operation of the device in FIG. 1;

DESCRIPTION OF THE PREFERRED EMBODIMENT

Figure 3A:
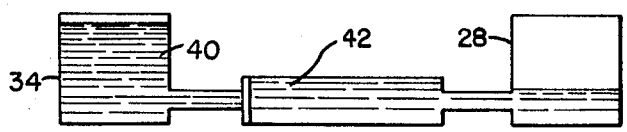
FIG. 3 is a diagrammatic view also for explaining the operation of the device illustrated in FIG. 1.

Referring to FIG. 1, there is illustrated an energy conversion system for converting thermal energy into electrical energy. A condenser unit 10 provides an enclosure including two separated top and bottom plate members 12 and 14 of suitable electrically conductive materials such as solid metals such as copper, silver or aluminum; liquid or solid metal films on suitable insulating dielectric coatings such as evaporated aluminum, copper or silver and including what is usually referred to as metallized plastics, conducting alloys and heavily doped semiconducting materials. To avoid leakage or dielectric breakdown, it is desirable but not necessary to provide dielectric coating 16 and 18 of a suitable material such as mylar of a thickness of about 1 mil or less on the inner surface of the two electrodes 12 and 14 respectively. Other suitable materials are polyethylene terephthalate, H-film (polyimide) and FEP fluorocarbon. The H-film and FEP fluorocarbon are also high-temperature polymers. Sidewall members 20 extending from the electrodes 12 and 14 complete the enclosure. The sidewall members 20 should be of a high-resistance material such as a plastic. Openings 22 and 24 are provided in opposite sidewalls 20 and a conduit 26 extends from the opening 24 to a dielectric storage chamber 28. A conduit 30 is provided from the other opening 22 through a suitable smoothing or valve chamber 32 to a thermal reservoir 34. The conduits 26 and 30 should be of high-resistance material, such as a plastic, adjacent the condenser 10 to not affect its operation. The remaining portions of conduits 26 and 30 can be made of metallic materials such as copper.

The reservoir 34 is simply an enclosure of a suitable material such as copper and having a large planar heat absorbing surface 36 onto which the heat radiations from a source 38 are directed. The heat absorbing surface should be large in comparison to volume of the reservoir 34. The surface 36 may be treated to increase the absorptivity. The reservoir 34 contains a suitable liquid dielectric material such as methanol referred to hereafter as a replacement dielectric material 40. This replacement dielectric material 40 is of low dielectric constant and fills the volume including the conduit 30, the chamber 32, the reservoir 34 and the enclosure within the condenser 10 to a movable diaphragm 31 therein. The replacement material 40 may be a solid liquid or gas. Solid nonpolar polymers such as polyethylene, polimide, mylar and FEP fluorocarbon are suitable. Methanol or ethanol may provide a suitable liquid. Nitrogen may serve as a suitable gas. At a predetermined temperature the replacement dielectric material 40 will be removed from the enclosure defined by the condenser 10 and the condenser 10 will be filled with an original dielectric material 42 of a high-dielectric constant material such as water, formamide, hydrozine or methanol. The original material 42 may be a solid or a liquid. The original material 42 has a higher dielectric constant than the replacement material 40. Upon application of heat to the reservoir 34 the replacement dielectric material 40 expands and forces the dielectric material 42 from the condenser 10 through the conduit 26 and into the dielectric storage chamber 28. The diaphragm 31 operates to keep the materials 40 and 42 separated.

A suitable electrical circuit is illustrated in FIG. 1 for extracting electrical energy as a result of capacitance change. The upper conductive electrode 12 may be connected to ground and the lower electrode 14 may be connected by lead 46, to a suitable switching circuitry. The operating condenser 10 is connected to a first diode 48 and a second diode 50. The lead 46 is connected to the anode of the diode 50 and the cathode of the diode 48. A suitable diode for the elements 48 and 50 is a low-leakage diode such as a Fairchild FD 300 diode, or any high-voltage diode stack with less than $10-1\mu$ A. reverse current, or one or more double-anode Zener diodes with similarly low-leakage current. The anode of the diode 48 is connected through a switch 52 to a terminal 56 of an inductance 58. The cathode of the diode 50 is connected through a switch 54 to the terminal 56 of the inductance 58. The other terminal 60 of the inductance 58 is connected to one electrode of a charging capacitor 62 with the other electrode of the capacitor 62 connected to ground. The terminal 60 is also connected to a first terminal of a double anode Zener diode 64. The lead 46 is also connected through a switch 74 to the cathode of a diode 70 with the anode of the diode 70 connected to a terminal 86 of an inductance 88. The lead 46 is also connected through a switch 72 to the anode of a diode 78. The cathode of the diode 78 is connected to the terminal 86 of the inductance 88. The other terminal 90 of the inductance 88 is connected through a load capacitor 92 to ground. The terminal 90 is also connected to the second terminal of the double anode Zener diode 64.

Figure 3B:
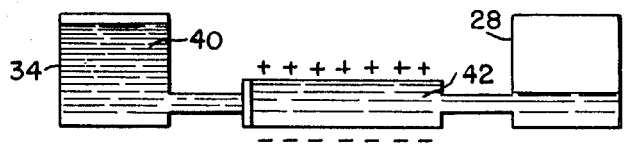
Figure 3C:
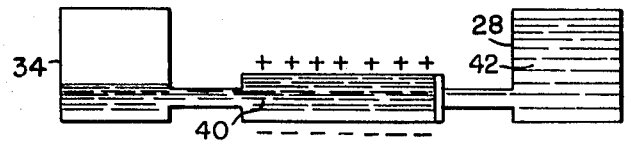

The operation of the system may be described by reference to FIGS. 1, 2 and 3. If it is first assumed that heat is prevented from radiating onto the thermal reservoir 34, the original material 42 will substantially fill the enclosure in the condenser 10 as illustrated in FIG. 3A. The sequential heating and cooling of the reservoir can be accomplished in any suitable manner. For example a shutter might be utilized or the reservoir might be rotated as in a space vehicle. The switch 52 is closed which permits the charging condenser 62 to send charge through the inductance 58 and the diode 48 to the condenser 10. Charge is placed on the condenser 10 and the inductance 58 and the diode 48 causes the current flow to continue to reversal and stop, thus transferring a maximum amount of energy to the condenser 10. The switch 52 is then opened. This charging operation is also illustrated in the diagram in FIG. 2 wherein the arrow indicates that the step of charging the condenser 10 is accomplished during the period on the cycle from one to two. The charged condition is illustrated in FIG. 3B.

After the charging of the condenser 10, the heat is directed onto the reservoir 34 causing the replacement material 40 to expand and displace the original material 42 driving the original material 42 into the reservoir or storage chamber 28 and forcing the replacement material 40 into the condenser 10. This is illustrated in the cycle between 2 and 3 of FIG. 2 and also FIG. 3C.

Figure 3D:
Figure 3E:
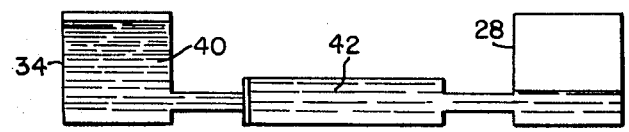
Figure 5A:
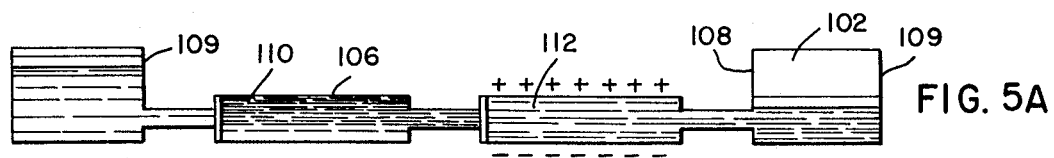
FIG. 5 is a diagrammatic view illustrating the operation of the device shown in FIG. 4.
Figure 5B:
Figure 5C:
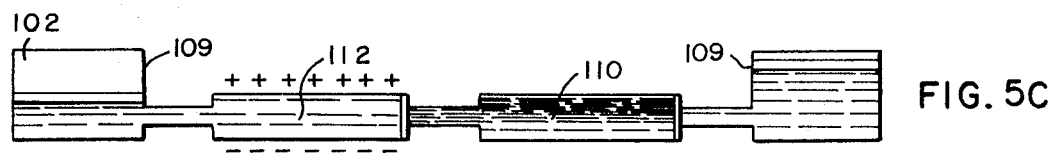
Figure 5D:
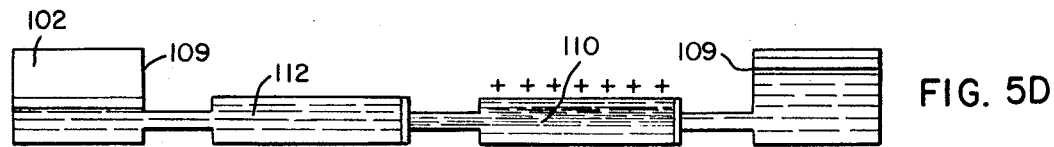
Figure 5E:
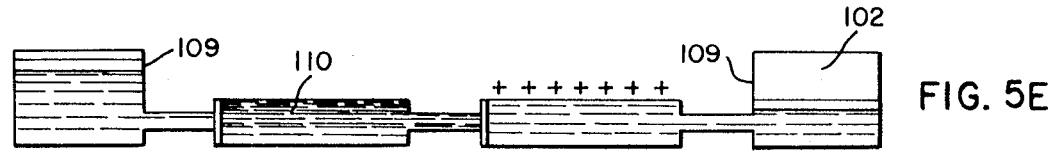
Figure 5F:
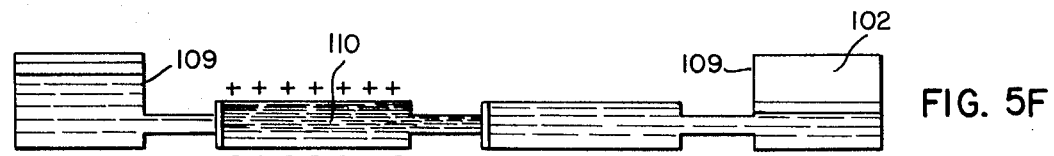

The switch 72 is closed which permits the condenser 10 to discharge through the switch 72, the diode 78 and the inductance 88 to the storage condenser 92. Because of the higher voltage on condenser 10, the charge and energy flow into the load condenser 92. Again the inductance 88 and the diode 78 eliminate the energy loss when contact is made between the two condensers with unequal energy. The discharge of the condenser 10 is illustrated by FIG. 3D and also between the points 3 and 4 on the cycle in FIG. 2. The heat directed onto the reservoir 34 may then be removed and the cooling permits the replacement material 40 to return to its original volume permitting the original material 42 to fill the condenser 10 and the cycle is ready to repeat. This restoring of the original dielectric is indicated by the diagram in FIG. 3E and between the points 4 and 1 in the cycle diagram of FIG. 2.

As previously explained the capacitance of a condenser 10 can be changed by changing the materials between the electrodes 1, 12 and 14. If the condenser 10 is charged with the original material of high dielectric constant, and the replacement material 40 of lower dielectric constant is then inserted to decrease the capacitance without changing the charge on the condenser, the voltage across the condenser increases. Here, this increase of energy is: $(\frac{1}{2})(Q^2)[1/C_2-1/C_1]$. $C_1$ is the original capacitance and $C_2$ is the capacitance with a material of less dielectric constant. The electrical energy obtained must be furnished by the phenomenon or phenomena which cause the dielectric of condenser 10 to change. The change of the dielectric within a condenser may be provided as illustrated in FIG. 1 by utilizing thermal expansion of solid, liquid or gas or the expansion during a phase change or a chemical change to push one dielectric out of the region between the electrodes of the condenser and substitute another material. For the purposes of this invention, the general term "dielectric" includes conductors. The distinguishing feature of the conductor being that it represents a dielectric of infinite dielectric constant. If the condenser is charged and then the material replaced by one of a lower dielectric constant, the capacitance of the condenser is decreased and its electrical energy increased. The difference in electrical energy is obtained at the expense of heat or other energy which causes the expansion of a material which accomplished the change in the dielectric in the condenser.

By discharging the condenser when the replacement material is in place, the additional energy is extracted from the system. If then the replacement material is cooled so as to cause contraction and bring about return of the original material in the condenser, the condenser capacitance reverts to its original value so that charging once again can be performed and a new cycle commenced. Periodic charging, change of material, discharging, and return of the original material is a repetitive cycle in which heat energy disappears and electrical energy appears.

In the specific embodiments shown in FIGS. 1 and 3, a planar geometry type of condenser is illustrated. It is also possible to utilize a concentric capacitor member and utilize the inner electrode as one conductor and the outer conductor as the other electrode. It is evident that the capacitance and therefore the energy changes obtainable with this replacement dielectric cycle are much larger than can be obtained on change of dielectric constants of single dielectric or ferroelectric materials as used in the thermodielectric method of energy conversion. The increased energy in the condenser is obtained at the expense of the work required to remove the original dielectric or conducting fluid from the condenser and replace it by the replacement material of a lower dielectric constant. This work is a direct result of the expansion of a fluid in a central reservoir which is subjected to the radiation or other heating and in the other half of the cycle to the radiative cooling. It is also obvious that the cycle can be performed in reverse that is, the conductor or higher dielectric material is brought into the space between the electrodes upon the heating of the reservoir and is removed through suitable means, and replaced by lower dielectric constant material during cooling. This merely requires obvious changes in the electrical cycling.

Instead of relying upon internal cohesion of the fluid during contraction to produce the reverse flow during cooling, a reverse pressure may be used to provide a positive flow of the original dielectric back into the reservoir. This reverse pressure may be external or may be automatic as in a gas which is compressed by the movement of a dielectric during expansion and pushes back during the subsequent cooling. In the latter case, it will oppose the flow of the replacement material in the condenser during the heating cycle and the work done on it will be recovered during the cooling cycle.

Suitable materials for the fluid particularly a conductor would be liquid metal such as mercury, gallium, cesium or rubidium in appropriate temperature ranges. Other suitable materials would be fused salts or conducting solutions such as electrolytic materials. For space use, the low density of cesium and rubidium would be advantageous if corrosion and degradation problems could be overcome. Plastic film materials or waxes are suitable for films covering the electrodes. If conducting fluids are not used but high-dielectric constant fluids are used instead, any suitable noncorrosive organic or inorganic material which has a high dielectric constant and is liquid at the temperature of operation and meets other requirements may be used. Since the conversion of energy is accomplished by forcing a dielectric out of the condenser, other types of energy can be used to accomplish the same effect. Thus if the energy conversion is designed so that external pressure acts on the fluid in the reservoir then the energy of winds, waves, tides or other sources can be utilized. This system is also adapted to nuclear sources of power to utilize the direct or waste heat therefrom.

Figure 4:
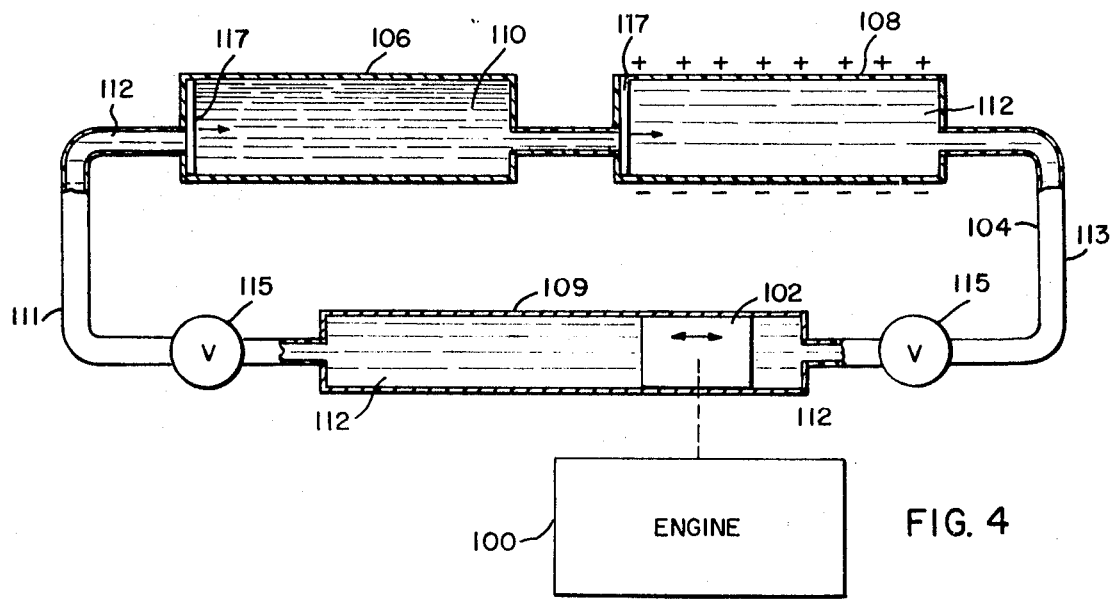
FIG. 4 illustrates another energy conversion system incorporating the teachings of this invention illustrating a mechanical energy input and a dual capacitor system.

Referring to FIGS. 4 and 5 there is illustrated a dual capacitor or push-pull type system. In FIG. 4 there is illustrated an engine 100 which may be of wind, tidal or other power provided with mechanical linkage for driving a piston 102 within a closed system 104. The closed system 104 includes a first capacitor 106 and a second capacitor 108. The piston 102 is within a cylinder 109 with conduits 111 and 113 connecting the cylinder 109 to the condensers 106 and 108 respectively. Valves 115 may be provided in conduits 111 and 113 for control; diaphragms 117 may be provided for isolating the material 110 from 112. A material 110 with high dielectric constant such as described above fills the capacitor 106 and the rest of the system 104 is filled with a material 112 of low dielectric constant such as described above. By a movement of the piston 102 the type of material within each condenser 106 and 108 may be changed from either material 110 or 112 to the other. By using two capacitors, a material may be pushed from a first condenser into a second condenser instead of into a storage chamber and in the second half of the cycle the material can return to the first condenser. By charging each capacitor while filled with a material having a high dielectric constant and then replacing with a material having a low dielectric constant each capacitor performs a cycle. This is illustrated in FIG. 5. Again the dielectric may be a solid, fluid or gas. Since work is being done on each half of the cycle, force is required to push the dielectric in either direction in either half of the cycle. A complete cycle provides the charging of the capacitor 106 when the high-dielectric constant material 110 is between the plates and simultaneously capacitor 108 is being discharged with material 112 between the plates since it is in a high energy state. This is illustrated in FIGS. 5A and 5B. The high-dielectric constant material 110 is then pushed from the charged capacitor 106 into the uncharged capacitor 108 and piston 102 is positioned as shown. The work input increases the energy in capacitor 106 and there is no change in the energy in capacitor 108. This is illustrated in FIG. 5C. The high energy on capacitor 106 is now removed by removing the charge and letting it flow into the storage output capacitor. Simultaneously a charge is placed on capacitor 108 as is illustrated in FIG. 5D. The piston 102 is then moved in opposite direction and will displace the high dielectric material 110 from capacitor 108 into capacitor 106. The energy in capacitor 108 increases but there is no change in the energy of capacitor 106 which is uncharged. This is illustrated in FIG. 5E and compares to 5A. Capacitor 108 is now discharged electrically thus extracting its energy and simultaneously capacitor 106 is charged; as illustrated in FIG. 5F and compares to FIG. 5B. The system is now in the original condition and the cycle has repeated itself.

The two-capacitor cycle illustrated in FIGS. 4 and 5 may be regarded as a subdivision of the capacitor 10 shown in FIG. 1. The capacitors may be stepped successively in the cycle of operation. The output voltage will be $n$ times that obtainable with a single capacitor.

Solid dielectric structures may be utilized. A piston or rotation of a cylinder provides means of positioning alternately high and low dielectric materials between plates of a condenser. The charging and discharging of the capacitor is correlated in time with the change of dielectric so that the same type of cycling takes place as described above with regard to fluid dielectrics.

Although the present invention has been described with a certain degree of particularity, it should be understood that the present disclosure has been made only by way of example and that numerous changes in the combination and arrangement of elements and components can be resorted to without departing from the scope and spirit of the present invention.

I claim:

1. An energy conversion system comprising a condenser member having a first and second electrode members, a first means of a predetermined dielectric constant, a second means of a dielectric constant different from said predetermined dielectric constant, means for sequentially positioning said first and second means within a space between said first and second electrodes, said means for sequentially positioning said first and second means comprising a reservoir having a charge-area heat-absorbing surface and in which said first means is a liquid material and fills said reservoir, said liquid material exhibiting the property of expansion of volume in response to heat.

2. An energy conversion system comprising a condenser member having a first and second electrode members, a first means of a predetermined dielectric constant, a second means of a dielectric constant different than said predetermined dielectric constant, means for sequentially positioning said first and second means within a space between said first and second electrodes, first circuit means including switching means and inductance means coupled to said condenser to store electrical charge when said first means is within said space, second circuit means including switching means and inductance means to extract said charge when said second means is within said space, said first and second means comprising liquid separated by a diaphragm in said system and said positioning means comprising a piston movable in response to input energy to thereby position said first and second means.

3. An energy conversion system comprising a first condenser member having a first and second electrode members, a first means of a predetermined dielectric constant, a second means of a dielectric constant different than said predetermined dielectric constant, means for sequentially positioning said first and second means within a space between said first and second electrodes, first circuit means including switching means and inductance means coupled to said condenser to store electrical charge when said first means is within said space and second circuit means including switching means and inductance means to extract said charge when said second means is within said space, a second condenser, said first and second means alternating between said condensers and in which said first and second circuit means alternate in storing and extracting charge from said condensers.